July 18, 1961 T. R. SMITH 2,992,843
SEAL CONNECTION
Filed Sept. 6, 1956
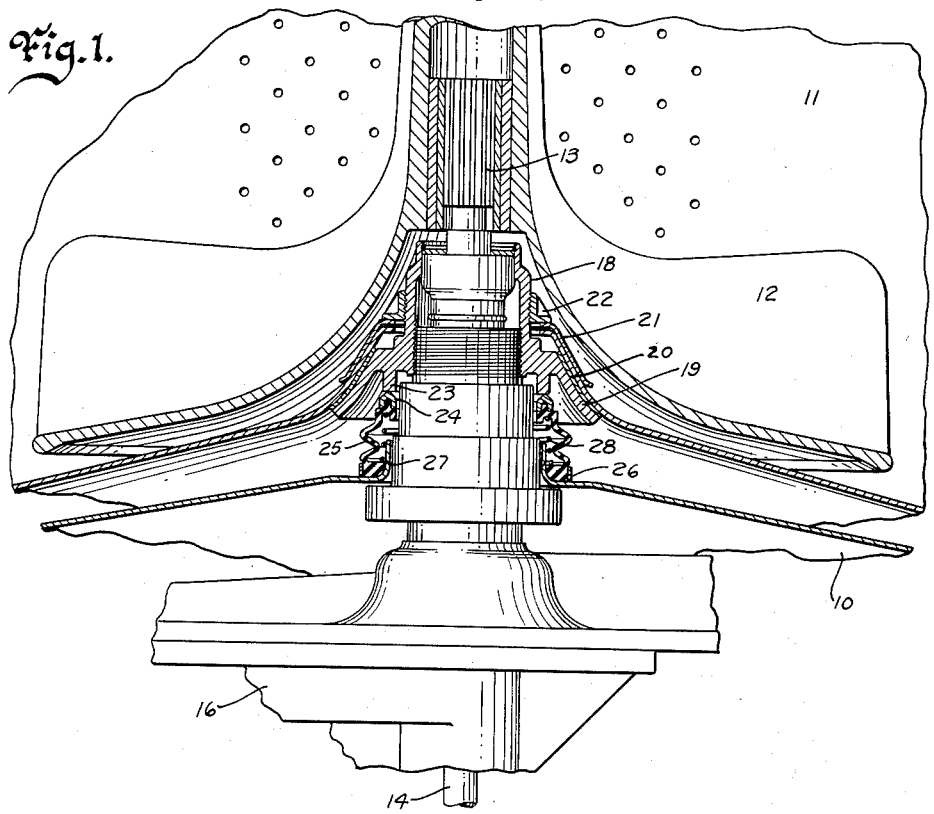
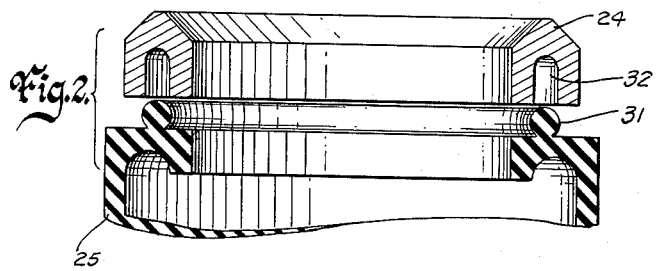
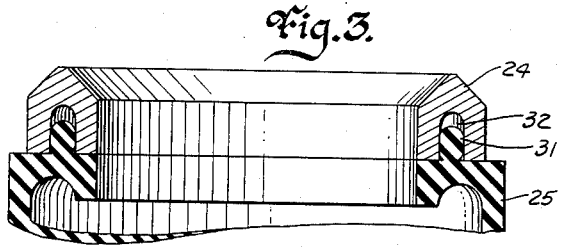
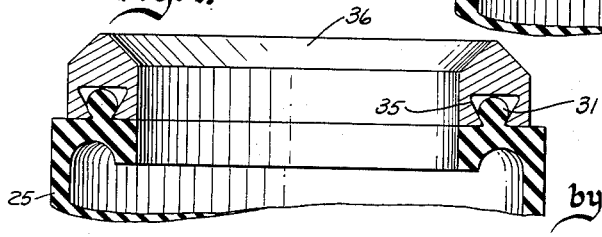
Inventor
Thomas R. Smith
by James L. Nittleton
Attorney

United States Patent Office 2,992,843
Patented July 18, 1961

2,992,843
SEAL CONNECTION
Thomas R. Smith, Newton, Iowa, assignor to The Maytag Company, Newton, Iowa, a corporation of Delaware
Filed Sept. 6, 1956, Ser. 608,308
2 Claims. (Cl. 286—11)

This invention relates to a novel construction for sealing and attaching a bellows sealing member to a second member. While not necessarily limited to such a construction, this novel connection is primarily concerned with an improvement in the fluid-tight attachment of a nose ring to a flexible bellows member forming a fluid-tight seal for a revoluble shaft which is encompassed by the bellows member and which is provided with a shoulder defining a surface for the nose ring during relative rotation between the shaft and the bellows member.

Boot seals of this type are presently formed by vulcanizing or gluing or permanently attaching in some way the nose ring to a flexible bellows member to achieve the desired strength and sealing characteristics between the nose ring and the bellows member. With this present type construction a damaged nose ring results in the entire boot seal assembly being scrapped even though the bellows sealing member itself is undamaged. In addition, the process of molding the nose ring to the bellows member is made more costly if, as is quite often the case, the nose piece breaks or cracks during the molding process.

With my novel construction the nose ring to be connected to the flexible bellows member is formed separately from the bellows member and is provided with an annular recess, preferably though not necessarily of uniform cross section, to receive in compression a mating annular ring formed on the resilient bellows member. By utilizing the squeeze fit between the nose ring and the bellows member as well as additionally relying upon a compression spring within the bellows member to urge these pieces together, a readily separable, more economical, and simple efficient seal can be provided.

In the drawings:
FIGURE 1 is a fragmentary cross sectional view of a washing machine incorporating my invention;
FIGURE 2 is an enlarged exploded view of the nose ring connection shown in FIGURE 1;
FIGURE 3 is a view similar to that of FIGURE 2 showing the parts in assembled position; and,
FIGURE 4 is a view similar to that of FIGURE 3 showing a second embodiment of my invention.

Now with reference to the accompanying drawings, FIGURE 1 shows reference numeral 10 representing the bottom wall of the non-rotatable tub adapted to receive fluid for the washing of clothes within tub 10 while numeral 11 represents the bottom wall of a revoluble perforate basket nested within tub 10 to perform a centrifuging operation during the spinning process of the washing operation. Within basket 11 is located a conventional type agitator 12 adapted to oscillate within basket 11 by means of its drive connection to agitator shaft 13 which is driven by drive shaft 14 through appropriate motion converting mechanism housed within the gear housing 16.

The upper extension of gear casing 16 is threaded to receive a mounting stem 18 which is provided with a mounting flange 19 for basket 11. Basket 11 is supported on flange 19 and is wedged aganist gasket 20 on that flange by means of a frusto-conical washer 21 mating substantially with the centrally located re-entrant portion of basket 11 which it abuts. Washer 21 in turn is wedged against the re-entrant portion of basket 11 by means of a large nut 22 threaded on the upper portion of the mounting stem 18. This, in effect, allows basket 11 to form a unitary connection with gear case 16 so that any movement imparted to the latter member will be likewise imparted to basket 11.

The mounting flange 19, which in effect forms a shoulder on the upper extension of power housing 16, is provided with a depending annulus 23 which provides a sealing surface frictionally engaged by the rigid annular nose ring 24 connected in turn to the flexible envelope or bellows member 25. Bellows member 25 is preferably made of resilient material such as rubber and has its lower end fastened by means of hose clamp 26 to the inturned flange 27 formed on the bottom wall of tub 10. Nose ring 24 is provided with a flat sealing surface which is maintained against the lower face of the depending annulus 23 by means of the coil spring 28 located within the bellows member 25 and pressing against the opposite ends of that member.

Since nose ring 24 is in practice constructed of hard carbon material, the past practice of molding or vulcanizing this ring to the bellows member 25 has caused a complete loss of the boot seal assembly formed from these parts whenever ring 24 cracked or was damaged in such a way as to impair its sealing function with annulus 23. This permanent type mechanical and sealing connection has also proved unsatisfactory in the molding process where the carbon nose ring has been so hard and brittle as to be easily damaged in the molding operation itself.

The instant invention is therefore directed to that particular type mechanical and sealing connection which utilized parts which could be made separately and fitted together to form a separable connection in case the carbon nose ring 24 became damaged prior to or even subsequent to the assembly of a machine incorporating this type bellows seal. It should be noted, however, that this invention need not be limited in use to the disclosed embodiment and may find other applications in use with different materials.

With the construction shown clearly in FIGURES 2 and 3 of the accompanying drawings, the carbon nose ring 24 is attached to and sealed to the boot seal bellows body 25 without experiencing nearly the losses encountered in prior constructions. In this particular type construction the carbon nose ring 24 and bellows body 25 have been formed separately to accommodate interchangeable and replaceable assembly parts.

In FIGURE 2, it will be seen that the bellows body 25 is provided with an annular male projection 31 of a substantially circular cross section which protrudes upwardly from the top of the bellows body 25. The nose ring 24 is in turn provided with an annular recess 32, preferably of uniform cross section, forming a female portion to receive the male projection 31. It will be noticed from the accompanying drawings that the width of the recess or groove 32 formed in the nose ring 24 is somewhat smaller than the cross sectional diametric extent of the male projection 31 so that in assembling the male and female portions the projecting male portion 31 must be forced into this recess 32 resulting in a compression of the male portion 31 within recess 32 to thereby provide a connection which will not only hold nose ring 24 in place but one which will seal members 24 and 25 together as well. While this type connection provides a unique fluid-tight mechanical connection without requiring that parts 24 and 25 be glued together, this construction naturally does not preclude the use of glue or other adhesives to permanently attach parts 24 and 25 together. It will be seen in FIGURE 1 that bellows member 25 is also urged into sealing relationship with nose ring 24 by the force of coil spring 28 which holds nose ring 24 against annulus 23. Nose ring 24 is also urged against annulus 23 by the resiliency of the bellows member itself.

FIGURE 4 shows a second embodiment of my invention in that the annular groove for receiving male member 31 has been formed of a different cross section. It will be seen in FIGURE 4 that the uniform cross section of the annular groove 35 formed in nose ring 36 is of inverted trapezoidal cross section to accommodate the expanding male projection 31 once it has been forced into that annular groove 35. This second type of construction provides a restricted neck portion in groove 35 and results in a better mechanical connection. It will be appreciated that other equivalent modifications of groove 35 may be made to produce a similar result. Except for the modification of groove 5 as set forth in FIGURE 4 the second embodiment is identical to that shown in FIGURES 1 to 3.

While the male member 31 has been illustrated as being of circular cross section only, it will be appreciated that equivalent modifications may be made in that member without departing from the spirit of my invention.

I claim:

1. An article of manufacture comprising, a fluid container provided with an opening therein, a bellows member encompassing said opening and anchored to said container, revoluble shaft means extending through said opening and said bellows member and provided with a shoulder defining a radial bearing surface facing said opening, a nose ring axially abutting said bearing surface and forming a fluid-tight connection with said bellows member, said connection including an annular resilient male member of substantially circular cross section axially projecting from said bellows member, a recess means axially facing said male member and formed in said nose ring defining an annular female portion of uniform cross section having at least a portion thereof of a smaller lateral dimension and having a greater axial dimension than that of said male member to receive said resilient male member in radial compression only to form a readily separable fluid-tight connection between said nose ring and said bellows member, and a spring member positioned within said bellows member bearing against said bellows behind said male member urging said nose ring against said bearing surface and resisting separation of said male member from said recess.

2. An article of manufacture comprising, a fluid container provided with an opening therein, a flexible bellows member encompassing said opening and anchored to said container, revoluble shaft means extending through said opening and said bellows member and provided with a shoulder defining a bearing surface axially facing said opening, a substantially rigid member axially abutting said bearing surface and forming a fluid-tight connection with said bellows member, said connection including an annular resilient male member of substantially circular cross section axially projecting from said bellows member, a recess means openly facing said male member and formed in said rigid member defining an annular female portion having at least a portion thereof of a smaller lateral dimension and having a greater axial dimension than that of said male member to receive said resilient male member in radial compression only to form a readily separable fluid-tight connection between said rigid member and said bellows member, and a resilient member positioned within said bellows member bearing against said bellows member behind said male member urging said rigid member axially against said bearing surface and resisting axial separation of said male member from said recess.

References Cited in the file of this patent

UNITED STATES PATENTS

| | | |
|---|---|---|
| 2,189,197 | Cerny | Feb. 6, 1940 |
| 2,287,207 | Vedovell | June 23, 1942 |
| 2,294,517 | Smith | Sept. 1, 1942 |
| 2,395,095 | Brady | Feb. 19, 1946 |
| 2,397,486 | Hoertz | Apr. 2, 1946 |
| 2,469,065 | Coss | May 3, 1949 |
| 2,522,231 | Loftis | Sept. 12, 1950 |
| 2,610,871 | Woodson | Sept. 16, 1952 |
| 2,722,439 | Brummer et al. | Nov. 1, 1955 |
| 2,766,944 | Lockley et al. | Oct. 16, 1956 |
| 2,815,967 | Payne et al. | Dec. 10, 1957 |